United States Patent
Ando et al.

(10) Patent No.: US 11,551,708 B2
(45) Date of Patent: Jan. 10, 2023

(54) LABEL GENERATION DEVICE, MODEL LEARNING DEVICE, EMOTION RECOGNITION APPARATUS, METHODS THEREFOR, PROGRAM, AND RECORDING MEDIUM

(71) Applicant: NIPPON TELEGRAPH AND TELEPHONE CORPORATION, Chiyoda-ku (JP)

(72) Inventors: Atsushi Ando, Yokosuka (JP); Hosana Kamiyama, Yokosuka (JP); Satoshi Kobashikawa, Yokosuka (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 239 days.

(21) Appl. No.: 16/763,360

(22) PCT Filed: Nov. 12, 2018

(86) PCT No.: PCT/JP2018/041803
§ 371 (c)(1),
(2) Date: May 12, 2020

(87) PCT Pub. No.: WO2019/102884
PCT Pub. Date: May 31, 2019

(65) Prior Publication Data
US 2020/0302953 A1 Sep. 24, 2020

(30) Foreign Application Priority Data
Nov. 21, 2017 (JP) .............................. JP2017-223840

(51) Int. Cl.
*G10L 25/63* (2013.01)
*G10L 15/06* (2013.01)
(Continued)

(52) U.S. Cl.
CPC ............ *G10L 25/63* (2013.01); *G06F 16/906* (2019.01); *G06N 20/00* (2019.01); *G10L 15/063* (2013.01)

(58) Field of Classification Search
CPC ....... G10L 25/63; G10L 15/06; G10L 15/063; G06N 20/00; G06F 16/906
See application file for complete search history.

(56) References Cited

U.S. PATENT DOCUMENTS

2012/0089396 A1* 4/2012 Patel ....................... G10L 15/04
704/249
2016/0162807 A1* 6/2016 Smailagic ............... G06N 99/00

FOREIGN PATENT DOCUMENTS

JP 2005199403 A * 7/2005

OTHER PUBLICATIONS

Fayek, Modeling Subjectiveness in Emotion Recognition with Deep Neural Networks: Ensembles vs Soft Labels, 2016, 2016 International Joint Conference on Neural Networks (IJCNN) (Year: 2016).*
(Continued)

*Primary Examiner* — Richemond Dorvil
*Assistant Examiner* — Ethan Daniel Kim
(74) *Attorney, Agent, or Firm* — Oblon, McClelland, Maier & Neustadt, L.L.P.

(57) ABSTRACT

With correct emotion classes selected as correct values of an emotion of an utterer of a first utterance from among a plurality of emotion classes $C_1, \ldots, C_K$ by listeners who have listened to the first utterance, as an input, the numbers of times $n_i$ that emotion classes $C_i$ have been selected as the correct emotion classes are obtained, and rates of the numbers of times $n_k$ to a sum total of the numbers of times $n_1, \ldots, n_K$ or smoothed values of the rates are obtained as correct emotion soft labels $t_k^{(s)}$ corresponding to the first utterance.

14 Claims, 4 Drawing Sheets

(51) Int. Cl.
G06N 20/00 (2019.01)
G06F 16/906 (2019.01)

(56) References Cited

OTHER PUBLICATIONS

International Search Report dated Jan. 29, 2019 in PCT/JP2018/041803 filed Nov. 12, 2018, 2 pages.

Fayek et al., "Modeling Subjectiveness in Emotion Recognition with Deep Neural Networks: Ensembles vs Soft Labels", Proc. of 2016JCNN, Jul. 24, 2016, pp. 566-570.

Huang et al., "Attention Assisted Discovery of Sub-Utterance Structure in Speech Emotion Recognition," in Interspeech 2016, pp. 1387-1391.

Murphy et al., "Cepstrum-Based Harmonics-to-Noise Ratio Measurement in Voiced Speech, "Lecture Notes in Artificial Intelligence, Nonlinear Speech Modeling and Applications, vol. 3445, Springer-Verlag, 2005, pp. 199-218.

\* cited by examiner

LABEL GENERATION DEVICE, MODEL LEARNING DEVICE, EMOTION RECOGNITION APPARATUS, METHODS THEREFOR, PROGRAM, AND RECORDING MEDIUM

TECHNICAL FIELD

The present invention relates to a technique for recognizing an utterer's emotion.

BACKGROUND ART

Recognition of an utterer's emotion from an utterance is an important technique. For example, at the time of counseling, it is possible to visualize a patient's emotion such as anxiety or sadness by recognizing the utterer's emotion, and deepening of a counselor's understanding and improvement of instruction quality can be expected. Further, by recognizing human emotions in a dialogue between a human being and a machine, it becomes possible to construct a more friendly dialog system that rejoices together when the human being rejoices and encourages the human being when the human being is sad. Hereinafter, a technique for, with a certain utterance as an input, estimating which of emotion classes (classified emotions, for example, normal, anger, joy and sadness) an utterer's emotion included in the utterance corresponds to is called emotion recognition.

Non-patent literature 1 discloses a conventional emotion recognition technique (hereinafter referred to as a conventional technique). In the conventional technique, an acoustic feature (for example, Mel-Frequency Cepstral Coefficients (MFCCs) or the like) corresponding to each short time is extracted from an utterance, and estimation of an emotion class is performed from an acoustic feature sequence, using a long short-term memory recurrent neural network (LSTM-RNN) which is a time-series model based on deep learning. At the time of learning an LSTM-RNN model, a set of pairs of an utterance and a correct emotion label of the utterance decided by a result of human listening are used. At this time, each correct emotion label is decided by, after a plurality of listeners listen to an utterance, a majority vote based on emotion classes that listeners feel correct, respectively (hereinafter referred to as listeners' respective correct emotion classes). Note that, if the correction emotion label is not decided by a majority vote (for example, in a case where all the listeners give different emotion classes, respectively), the utterance is regarded as having no correct emotion label and, therefore, cannot be used for model learning.

PRIOR ART LITERATURE

Non-Patent Literature

Non-patent literature 1: Che-Wei Huang, Shrikanth Narayanan, "Attention Assisted Discovery of Sub-Utterance Structure in Speech Emotion Recognition," in Interspeech 2016.

SUMMARY OF THE INVENTION

Problems to be Solved by the Invention

In the conventional technique, it is difficult to improve emotion recognition accuracy. For example, a time-series model based on deep learning, such as an LSTM-RNN model, can show a high estimation accuracy, while a large amount of learning data, such as tens of thousands of utterances, is required to demonstrate the high estimation accuracy. However, it is very difficult to collect a large amount of learning data of emotion recognition. This is because it is necessary to collect listeners' respective correct emotion classes from a plurality of listeners to decide a correct emotion label, and this work costs significantly much. For this reason, a limited amount of learning data, such as hundreds to thousands of utterances, has to be used practically. Furthermore, in the conventional technique, since only utterances for which correct emotion labels are decided by majority vote among learning data can be used for learning, there may be cases where only a part of the learning data can be used for model learning. As a result, the amount of learning data that can be used for model learning further decreases. Therefore, identification performance of a time-series model based on deep learning is not sufficiently demonstrated, and the emotion recognition accuracy decreases.

The present invention has been made in view of such a point, and an object is to improve the emotion recognition accuracy using limited learning data.

Means to Solve the Problems

With correct emotion classes selected as correct values of an emotion of an utterer of a first utterance from among a plurality of emotion classes $C_1, \ldots, C_K$ by listeners who have listened to the first utterance, as an input, the numbers of times $n_i$ that emotion classes $C_i$ have been selected as the correct emotion classes are obtained, and rates of the numbers of times $n_k$ to a sum total of the numbers of times $n_1, \ldots, n_K$ or smoothed values of the rates are obtained as correct emotion soft labels $t_k^{(s)}$ corresponding to the first utterance.

Effects of the Invention

By using correct emotion soft labels, it is possible to improve the emotion recognition accuracy using limited learning data.

DETAILED DESCRIPTION OF THE EMBODIMENTS

Embodiments of the present invention will be described below.

[Principle]

Figure 2:
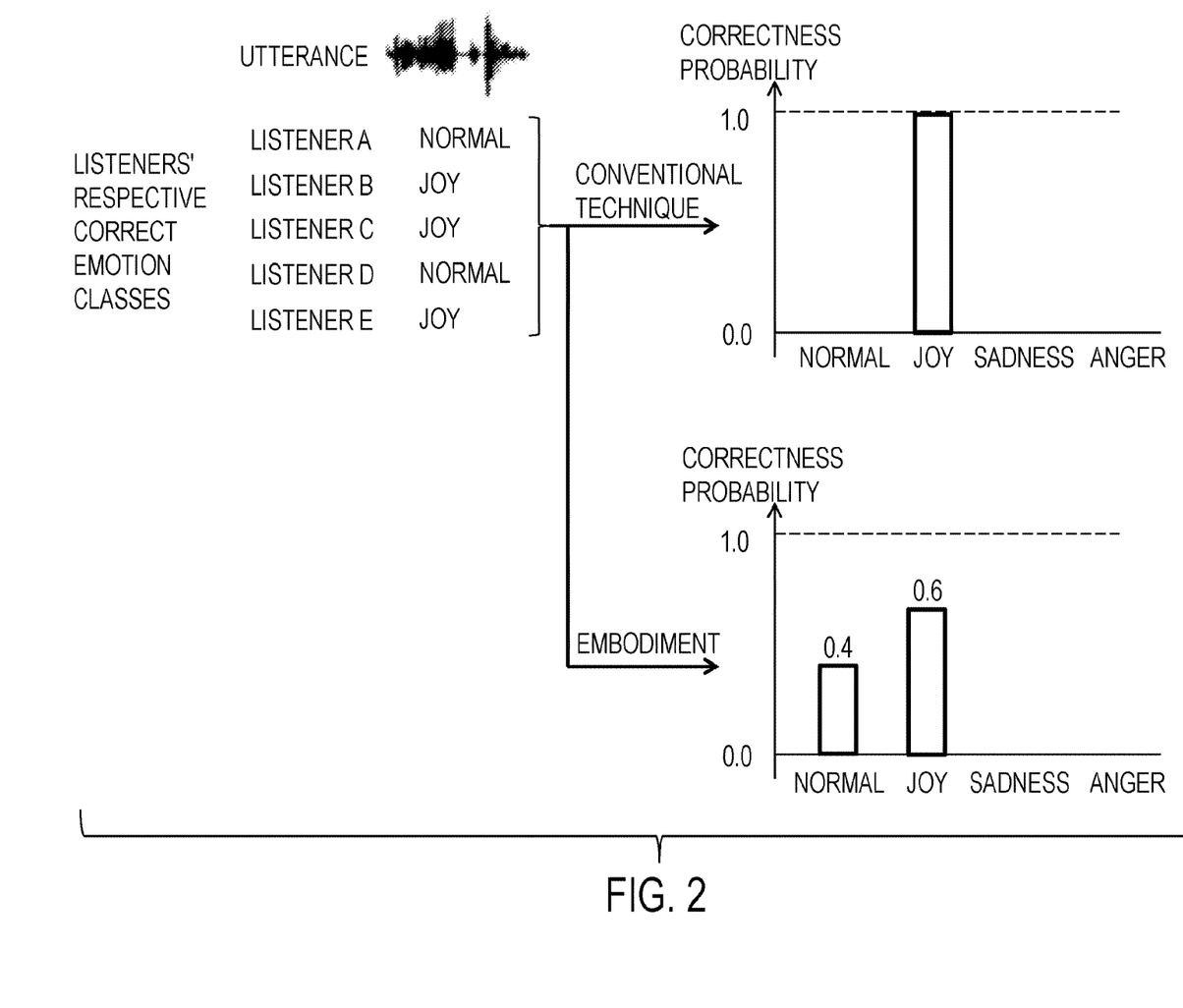
FIG. 2 is a conceptual diagram for explaining correct emotion soft labels of the embodiment.

A point of a method described in the embodiments is to, for the purpose of using all learning data, including utterances (utterance voices) for which correct emotion labels cannot be decided by a majority vote, for model learning, create such correct emotion labels that correctness probabilities can be assigned to a plurality of correct emotion classes (hereinafter referred to as correct emotion soft labels) in learning of an emotion recognition model (FIG. 2).

The time-series model based on deep learning in the conventional technique gives such a label that the correctness probability of only a certain emotion class is 1, and the correctness probabilities of other emotion classes are 0 as a correct emotion label. In this case, only the certain emotion class is regarded as correct, and the other emotion classes are regarded as completely incorrect to perform learning. For example, as illustrated in FIG. 2, if five listeners A to E give listeners' respective correct emotion classes, normal, joy, joy, normal and joy, respectively, to a certain utterance, such labels that the correctness probability of joy is 1, and the probabilities of other emotional classes are 0 are given. In this method, an utterance for which a correct emotional class cannot be decided by a majority vote is not used for learning because it cannot be decided for which emotion class the correctness probability is to be 1.

On the other hand, in methods described in the embodiments, such correct emotion soft labels that the correctness probabilities of a plurality of emotion classes are larger than 0 are given. For example, in the case of the example of FIG. 2, such correct emotion soft labels that the correctness probability of joy is 0.6, and the correctness probability of normal is 0.4 are given. In this case, learning is performed on the assumption that, though there is a strong possibility that the utterance is an utterance of joy, there is also a possibility that the utterance is an utterance of normal, but there is no possibility that the utterance is an utterance of the other classes. By assigning correctness probabilities to a plurality of emotion classes as described above, it becomes possible to use even an utterance for which a correct emotion label cannot be decided by a majority vote, for model learning.

For example, when there are four listeners, and they give listeners' respective correct emotion classes of normal, normal, joy and joy, respectively, the utterance cannot be used for model learning in the conventional technique because a correct emotion class cannot be decided for the utterance by a majority vote. On the other hand, in the present framework, the utterance can be used for model learning on the assumption that there is a possibility that the utterance is an utterance of joy and normal, and other emotions have not appeared. As a result, the amount of data that can be used for model learning increases, and, therefore, it is possible to construct a robuster model in comparison with the conventional technique.

Furthermore, as another advantage of the methods described in the embodiments, a point can be given that it is possible to cause a model to learn similarity among emotion classes. Since correct emotion soft labels correspond to the correctness probabilities of a plurality of emotion classes, the correct emotion soft labels indicate similarity among the plurality of emotion classes for an utterance. In the above example, there are listeners who have given the emotion class of joy to a certain utterance and listeners who have given the emotion class of normal to the utterance. Therefore, it can be said that there is some similarity between joy and normal. On the other hand, since there is no listener that has given the emotion class of sadness to the utterance, it can be said that similarity between joy and sadness is low. In this example, it is possible to cause a model to learn that there is some similarity between joy and normal, but the similarity between joy and sadness is low. It is thought that, by causing similarity among emotion classes to be learned, information is shared among particular emotion classes (in the above example, learning of the emotion class of normal also progresses by performing learning the emotion class of joy), and, as a result, it is possible to construct a more accurate emotion recognition model than the conventional technique in a situation where there is little learning data.

The correct emotion soft labels are required to be vectors expressing a degree of which emotion a human being would feel. In the embodiments, the correct emotion soft labels are decided from a set of listeners' respective correct emotion classes given by listeners. First, using correct emotion classes that listeners who have listened to an utterance have selected as correct values of an emotion of an utterer of the utterance from among a plurality of emotion classes $C_1, \ldots, C_K$, the numbers of times n that the emotion classes $C_i$ have been selected as correct emotion classes are determined. Here, i is a subscript indicating identification numbers of the emotion classes; $i=1, \ldots, K$ is assumed; and K is an integer equal to or larger than 2 indicating the total number of emotion classes. Hereinafter, k is also a subscript indicating the identification numbers of the emotion classes, and $k=1, \ldots, K$ is assumed. In the example of FIG. 2, K=4 is assumed, and, for example, $C_1$="normal", $C_2$="joy", $C_3$="sadness" and $C_4$="anger" are assumed. Next, rates of the numbers of times $n_k$ relative to a sum total of the numbers of times $n_1, \ldots, n_K$ or smoothed values of the rates are obtained as correct emotion soft labels $t_k^{(s)}$ corresponding to the utterance. For example, the correct emotion soft labels $t_k^{(s)}$ are given based on Formula (1) below.

[Equation 1]

$$t_k^{(s)} = \frac{\alpha + n_k}{\alpha K + \sum_{i=1}^{K} n_i} \quad (1)$$

In the case of $\alpha=0$, the correct emotion soft labels $t_k^{(s)}$ are values obtained by dividing the numbers of appearances $n_k$ of the emotion classes $C_1, \ldots, C_K$ by a total number of the numbers of appearance $n_1, \ldots, n_K$ of the listeners' respective correct emotion classes given by the listeners (rates of the numbers of times $n_k$ to the sum total of the numbers of times $n_1, \ldots, n_K$) (Formula (2)). For example, the correct emotion soft labels $t_k^{(s)}$ of the utterance in the example of FIG. 2 are: $t_1^{(s)}=0.4$, $t_2^{(s)}=0.6$, $t_3^{(s)}=0$ and $t_4^{(s)}=0$.

[*Equation* 2]

$$t_k^{(s)} = \frac{n_k}{\sum_{i=1}^{K} n_i} \quad (2)$$

In the case of $\alpha>0$, the correct emotion soft labels $t_k^{(s)}$ are values obtained by dividing the numbers of appearances of the emotion classes by the sum total of the numbers of appearances of the listeners' respective correct emotion classes given by the listeners when the numbers of appearances of the emotion classes are assumed to be (the actual numbers of appearance+$\alpha$). That is, in the case of $\alpha>0$, smoothed values of the rates of the numbers of times $n_k$ to the sum total of the numbers of times $n_1, \ldots, n_K$ are the correct emotion soft labels $t_k^{(s)}$. For example, in the case of $\alpha=1$, the correct emotion soft labels $t_k^{(s)}$ are as shown by Formula (3) below.

[Equation 3]

$$t_k^{(s)} = \frac{1 + n_k}{K + \sum_{i=1}^{K} n_i} \quad (3)$$

If the sum total of the numbers of appearance of the listeners' respective correct emotion classes is small, there is a possibility that, actually, emotions of other emotion classes may be slightly felt though the other emotion classes are not included in the obtained listeners' respective correct emotion classes (for example, in the above example, there is a possibility that, actually, a slight amount of sadness is included). By setting α>0, it is possible to reflect such a slightly felt emotion on learning data. As α increases, correct emotion soft labels that with a stronger possibility of an emotion other than emotions of the listeners' respective correct emotion classes being included are obtained. Therefore, α is increased when the number of listeners is small, and α is decreased when the number of listeners is large. For example, $α=α_1$ is set when the number of listeners is $M_1$, and $α=α_2$ is set when the number of listeners is $M_2$. Here, $M_1>M_2$ and $0<α_1<α_2$ are satisfied.

By performing learning processing using a set including pairs between correct emotion soft labels $t_k^{(s)}$ corresponding to an utterance and an acoustic feature sequence of the utterance as learning data, an emotion recognition model for estimating an emotion of an utterer of an input utterance from an acoustic feature sequence of the input utterance is obtained. By applying an acoustic feature sequence of an input utterance to this emotion recognition model, it is possible to accurately estimate an emotion of an utterer of the input utterance. As described above, in the methods of the embodiments, it is possible to improve the emotion recognition accuracy using limited learning data.

First Embodiment

A first embodiment will be described. First, an outline of the first embodiment will be shown.
<At the Time of Calculating Correct Emotion Soft Labels>

1. For utterances collected as learning data, a plurality of listeners listen to each utterance and give listeners' respective correct emotion classes to the utterance. That is, the listeners who have listened to the utterance select correct emotion classes (the listeners' correct emotion classes), respectively, from among the plurality of emotion classes $C_1, \ldots, C_K$ as correct values of an emotion of an utterer of the utterance. One listener may select only one correct emotion class for one utterance. Otherwise, one listener may select one or more correct emotion classes for one utterance. This is because there may be a case where, when a certain utterance is listened to, it may be felt that a plurality of emotions are included (for example, hatred and anger are included).

2. Using the listeners' respective correct emotion classes obtained for each utterance, the numbers of times $n_i$ (i=1, . . . , K) that the emotion classes $C_i$ have been selected as correct emotion classes are obtained. The numbers of times $n_1, \ldots, n_K$ are obtained for each utterance.

3. Using the numbers of times $n_i$ (i=1, . . . , K), correct emotion soft labels $t_k^{(s)}$ are calculated. That is, rates of the numbers of times $n_k$ to a sum total of the numbers of times $n_1, \ldots, n_K$ or smoothed values of the rates are obtained as the correct emotion soft labels $t_k^{(s)}$ corresponding to the utterance. The correct emotion soft labels $t_k^{(s)}$ are obtained, for example, based on Formula (1). The correct emotion soft labels $t_k^{(s)}$ are obtained for each utterance.

<At the Time of Model Learning>

By learning processing with a set of pairs between correct emotion soft labels $t_k^{(s)}$ corresponding to an utterance and a voice feature sequence of the utterance as learning data, an emotion recognition model for estimating an emotion of an utterer of an input utterance from an acoustic feature sequence of the input utterance is obtained. By performing learning of an emotion recognition model using the correct emotion soft labels $t_k^{(s)}$, it is possible to use even an utterance for which a correct emotion label cannot be decided by a majority vote, for model learning. Since the amount of data that can be used for model learning increases, it is possible to construct a more accurate emotion recognition model. An example of the emotion recognition model is a probability model for obtaining output values $y_k$ about posterior probabilities of the emotion classes $C_k$ for an acoustic feature sequence of an input utterance. For example, a time-series model based on deep learning can be used as an emotion recognition model. In this case, at the time of calculating a loss function of the model, not conventional correct emotion labels but correct emotion soft labels are used. This learning processing includes processing for obtaining output values $y_k^{(s)}$ about posterior probabilities of the emotion classes $C_k$ by inputting a voice feature sequence of an utterance, which is learning data, to an emotion recognition model in a learning process, and leaning an emotion recognition model with rates of function values for the output values $y_k^{(s)}$ to a sum total of function values for the output values $y_1^{(s)}, \ldots, y_K^{(s)}$ as posterior probabilities $p_k^{(s)}$ of the emotion classes $C_k$, and with a sum total of products between function values for $p_k^{(s)}$ and correct emotion soft labels $t_k^{(s)}$ for k=1, . . . , K as a loss function. Note that the output values $y_k^{(s)}$ are output values $y_k$ obtained by inputting an acoustic feature sequence corresponding to learning data which is given the correct emotion soft labels $t_k^{(s)}$, to the emotion recognition model. An example of the function values for the output values $y_k^{(s)}$ is non-decreasing function values for $y_k^{(s)}$ (for example, monotonically increasing function values for $y_k^{(s)}$), and an example of the function values for $p_k(s)$ is non-decreasing function values for $p_k^{(s)}$ (for example, monotonically increasing function values for $p_k^{(s)}$). For example, a loss function $L_s$ is calculated based on Formulas (4) and (5) below.

[Equation 4]

$$L_s = \sum_{k=1}^{K} t_k^{(s)} \log(p_k^{(s)}) \quad (4)$$

$$p_k^{(s)} = \frac{\exp(y_k^{(s)})}{\sum_{i=1}^{K} \exp(y_i^{(s)})} \quad (5)$$

That is, a soft-max function is used as the loss function of the time-series model based on deep learning, and, at the time of calculating the soft-max function, correct emotion labels as in the conventional technique (such labels that the correctness probability of only a certain emotion class is 1, while the correctness probabilities of other emotion classes are 0) is not used, but the correct emotion soft labels $t_k^{(s)}$ taking a range of 0 to 1 in the emotion classes $C_k$ are used.

Except for the part of calculating the loss function, a method similar to learning of a time-series model based on deep learning in the conventional technique is adopted. For example, update of model parameters is performed by applying an error back propagation method to the loss function $L_s$.

<At the Time of Emotion Recognition>

An acoustic feature sequence of an input utterance is input to an emotional recognition model obtained by learning to obtain information about estimation of an emotion of an utterer of the input utterance. If the emotion recognition model is a probability model for obtaining output values $y_k$ about posterior probabilities of the emotion classes $C_k$ for an acoustic feature sequence of an input utterance, the emotion estimation information is obtained based on the output values $y_k$. For example, the output values $y_1, \ldots, y_K$ may be the emotion estimation information; function values for the output values $y_1, \ldots, y_K$ may be the emotion estimation information; and information indicating such emotion classes $C_k$ that the posterior probabilities indicated by the output values $y_k$ are the largest may be the estimation information. Examples of function values for the output values $y_k$ are: a row obtained by re-arranging $y_1, \ldots, y_K$ in descending order of values, two or more and fewer than K output values selected from $y_1, \ldots, y_K$ in descending order of values, and output values equal to or above a threshold among $y_1, \ldots, y_K$.

Next, details of the first embodiment will be described using drawings.

<Configuration and Processing>

Figure 1:
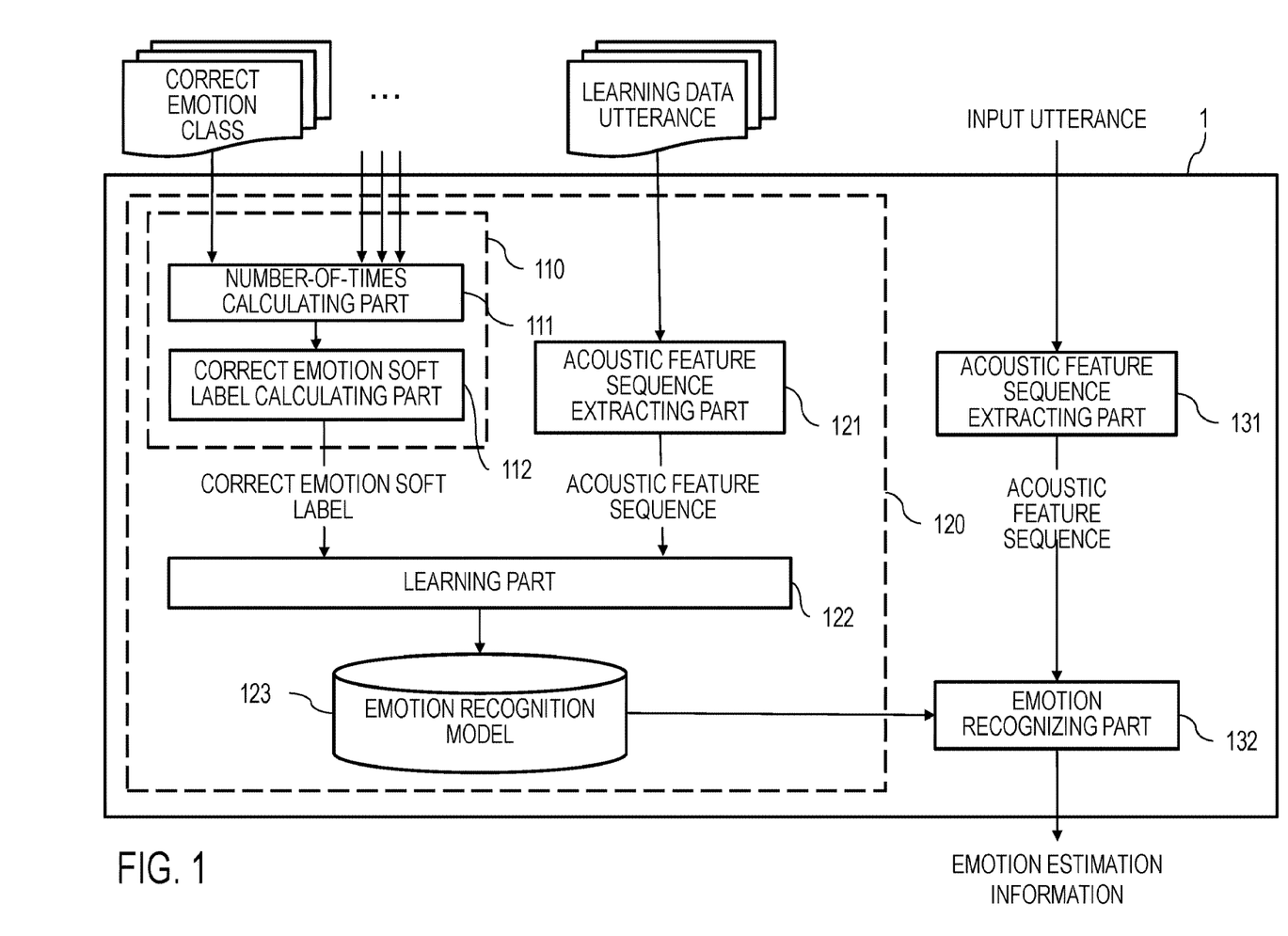
FIG. 1 is a block diagram illustrating a functional configuration of a label generation device of a first embodiment.

As illustrated in FIG. 1, an emotion recognition apparatus 1 of the present embodiment has a model learning device 120, an acoustic feature sequence extracting part 131 and an emotion recognizing part 132. The model learning device 120 has a label generation device 110, an acoustic feature sequence extracting part 121, a learning part 122 and a storing part 123. The label generation device 110 has a number-of-times calculating part 111 and a correct emotion soft label calculating part 112.

<Number-of-Times Calculating Part 111>

With listeners' respective correct emotion classes of a plurality of listeners for an utterance which is learning data (a learning data utterance) as an input, the number-of-times calculating part 111 obtains and outputs the numbers of times $n_i$ that the emotion classes $C_i$ have been selected as the listeners' correct emotion classes. That is, with correct emotion classes which a plurality of listeners who have listened to a learning data utterance (a first utterance) have selected as correct values of an emotion of an utterer of the utterance from among the plurality of emotion classes $C_1, \ldots, C_K$ (listeners' respective correct emotion classes) as an input, the number-of-times calculating part 111 obtains and outputs the numbers of times $n_i$ ($i=1, \ldots, K$) that the emotion classes $C_i$ have been selected as the correct emotion classes. In the present embodiment, listeners' respective correct emotion classes of two or more listeners are used. However, as listeners' respective correct emotion classes of a larger number of listeners are used, similarity among emotions classes that a human being feels is expressed more as a numerical value. Therefore, it is desirable to input as many listeners' respective correct emotion classes as possible to the number-of-times calculating part 111. Further, there are a plurality of learning data utterances. The numbers of times $n_i$ are obtained for each learning data utterance, and the numbers of times $n_i$ corresponding to each learning data utterance are sent to the correct emotion soft label calculating part 112 (step S111).

<Correct Emotion Soft Label Calculating Part 112>

With the numbers of times $n_k$ corresponding to a learning data utterance as an input, the correct emotion soft label calculating part 112 calculates and outputs rates of the numbers of times $n_k$ to a sum total of the numbers of times $n_1, \ldots, n_K$ or smoothed values of the rates as correct emotion soft labels $t_k^{(s)}$ corresponding to the learning data utterance. The correct emotion soft label calculating part 112 obtains and outputs the correct emotion soft labels $t_k^{(s)}$, for example, based on Formula (1) described before. In the case of $\alpha=0$ in Formula (1), the correct emotion soft labels $t_k^{(s)}$ are values obtained by dividing the number of appearances of the emotion classes by a total number of the numbers of appearances of listeners' respective correct emotion classes given by listeners (rates of the numbers of times $n_k$ to a sum total of the numbers of times $n_1, \ldots, n_K$) (Formula (2)). For example, if it is assumed that K=4, $C_1$="normal", $C_2$="joy", $C_3$="sadness" and $C_4$="anger", that the number of listeners is four, and that the listeners give listeners' respective correct emotion classes of normal, normal, joy and normal, respectively, for a certain utterance, the correct emotion soft labels $t_k^{(s)}$ of the utterance are $t_1^{(s)}=0.75$, $t_2^{(s)}=0.25$, $t_3^{(s)}=0$ and $t_4^{(s)}=0$. In the case of $\alpha=1$ in Formula (1), the correct emotion soft labels $t_k^{(s)}$ are values obtained by dividing the new numbers of appearances of the emotional classes $n_k+1$ when values obtained by adding 1 to the numbers of appearances of the emotion classes $n_k$ are assumed to be the new numbers of appearances, by a total of the new numbers of appearances of the emotional classes $n_t+1$ (Formula (3)). For example, if it is assumed that K=4, $C_1$="normal", $C_2$="joy", $C_3$="sadness" and $C_4$="anger", that the number of listeners is four, and that the listeners give listeners' respective correct emotion classes of normal, normal, joy and normal, respectively, for a certain utterance, the correct emotion soft labels $t_k^{(s)}$ of the utterance are $t_1^{(s)}=0.5$, $t_2^{(s)}=0.125$, $t_3^{(s)}=0.25$ and $t_4^{(s)}=0.125$. The correct emotion soft labels $t_k^{(s)}$ are obtained for each learning data utterance (step S112).

<Acoustic Feature Sequence Extracting Part 121>

With a learning data utterance as an input, the acoustic feature sequence extracting part 121 extracts and outputs a voice feature sequence of the learning data utterance. The acoustic feature sequence of the present embodiment refers to what is obtained by time-dividing a learning data utterance with short time windows, determining an acoustic feature for each short time window and arranging vectors of the acoustic feature in time-series order. The acoustic feature of the present embodiment includes, for example, any one or more of MFCCs, a fundamental frequency, logarithmic power, a harmonics-to-noise ratio (HNR), a voice probability, a zero-crossing rate, and first derivation or second derivation thereof. The voice probability is determined, for example, by a likelihood ratio of a voice/non-voice GMM model learned beforehand. The HNR is determined, for example, by a method based on a cepstrum (Reference document 1: Peter Murphy, Olatunji Akande, "Cepstrum-Based Harmonics-to-Noise Ratio Measurement in Voiced Speech, "Lecture Notes in Artificial Intelligence, Nonlinear Speech Modeling and Applications, Vol. 3445, Springer-Verlag, 2005). By using more acoustic features, various features included in an utterance can be expressed, and the emotion recognition accuracy tends to be improved (step S121).

<Learning Part 122>

By learning processing with a set of pairs between correct emotion soft labels $t_k^{(s)}$ corresponding to a learning data utterance and a voice feature sequence of the learning data utterance as learning data, the learning part 122 obtains an emotion recognition model for estimating an emotion of an utterer of an input utterance from an acoustic feature sequence of the input utterance (a first emotion recognition model) and outputs the emotion recognition model. Here, an example of adopting an emotion recognition model structure similar to that of the conventional technique is shown. That is, an emotion recognition model configured with a combination of a bidirectional LSTM-RNN and a fully connected layer called an attention layer is adopted. A difference from the conventional technique is a loss function of the emotion recognition model. Though a soft-max function is also used as the loss function in the present embodiment similarly to the conventional technique, the correct emotion soft labels $t_k^{(s)}$ are used at this time. That is, output values $y_k^{(s)}$ about posterior probabilities of the emotion classes $C_k$ are obtained by inputting a voice feature sequence of a learning data utterance to an emotion recognition model in a learning process, and rates of function values for output values $y_k^{(s)}$ to a sum total of function values for the output values $y_1^{(s)}, \ldots, y_K^{(s)}$ are set as $p_k^{(s)}$, and a sum total of products between function values for $p_k^{(s)}$ and correct emotion soft labels $t_k^{(s)}$ for $k=1, \ldots, K$ are set as a loss function. For example, the learning part 122 calculates a loss function $L_s$ based on Formulas (4) and (5) described before and updates model parameters of the emotion recognition model in the learning process based on the loss function $L_s$. That is, the learning part 122 updates the model parameters of the emotion recognition model in the learning process so that the loss function $L_s$ is minimized. For example, the learning part 122 updates the model parameters by applying an error back propagation method to the loss function $L_s$ (step S122). Information identifying an obtained emotion recognition model (for example, the model parameters) is stored into the storing part 123 (step S123).

<Acoustic Feature Sequence Extracting Part 131>

With an input utterance uttered by an utterer targeted by emotion estimation as an input, the acoustic feature sequence extracting part 131 extracts and outputs an acoustic feature sequence of the input utterance. The processing by the acoustic feature sequence extracting part 131 is the same as the processing of the acoustic feature sequence extracting part 121 described before (step S131).

<Emotion Recognizing Part 132>

The emotion recognizing part 132 applies an acoustic feature sequence of an input utterance to the emotion recognition model identified by the information read from the storing part 123 to obtain and output estimation information about an emotion of an utterer of the input utterance. As described before, if the emotion recognition model is a probability model for obtaining output values $y_k$ about posterior probabilities of the emotion classes $C_k$ for an acoustic feature sequence of an input utterance, the emotion recognizing part 132 obtains output values $y_k$ with an acoustic feature sequence of an input utterance as an input; and obtains and outputs emotion estimation information based on the output values $y_k$. An example of the emotion estimation information based on the output values $y_k$ is the output values $y_k$, function values for the output values $y_k$, or information indicating such emotion classes $C_k$ that the posterior probabilities indicated by the output values $y_k$ are the largest. Since the structure of the emotion recognition model of the present embodiment is similar to the structure of the emotion recognition model of the conventional technique, the emotion recognizing part 132 can obtain output vectors $(y_1, \ldots, y_K)$ of an emotion recognition model about posterior probabilities of an emotion of an utterer of an input utterance by performing forward propagation of the emotion recognition model with the acoustic feature sequence of the input utterance as an input (step S132).

Second Embodiment

A second embodiment will be described. In the present embodiment, after leaning an emotion recognition model by the conventional technique, additional learning of the emotion recognition model is performed using correct emotion soft labels. Since learning processing using the correct emotion soft labels uses a loss function with the same structure as the emotion recognition model learning processing of the conventional technique (the only difference is the correct emotion soft labels), additional learning from the emotion recognition model learned by the conventional technique is possible if a total number K of the emotional classes $C_i$ is the same. By the present embodiment, it is possible to construct an emotion recognition model with a further improved accuracy, based on an emotion recognition model of the conventional technique. In the present embodiment, by being based on an emotion recognition model of the conventional technique, construction of a more accurate emotion recognition model can be expected in comparison with the first embodiment. Hereinafter, description will be made mainly on points different from the first embodiment, and the description will be simplified by using the same reference numerals for the same matters as the first embodiment.

Details of the second embodiment will be described using drawings.

<Configuration and Processing>

Figure 3:
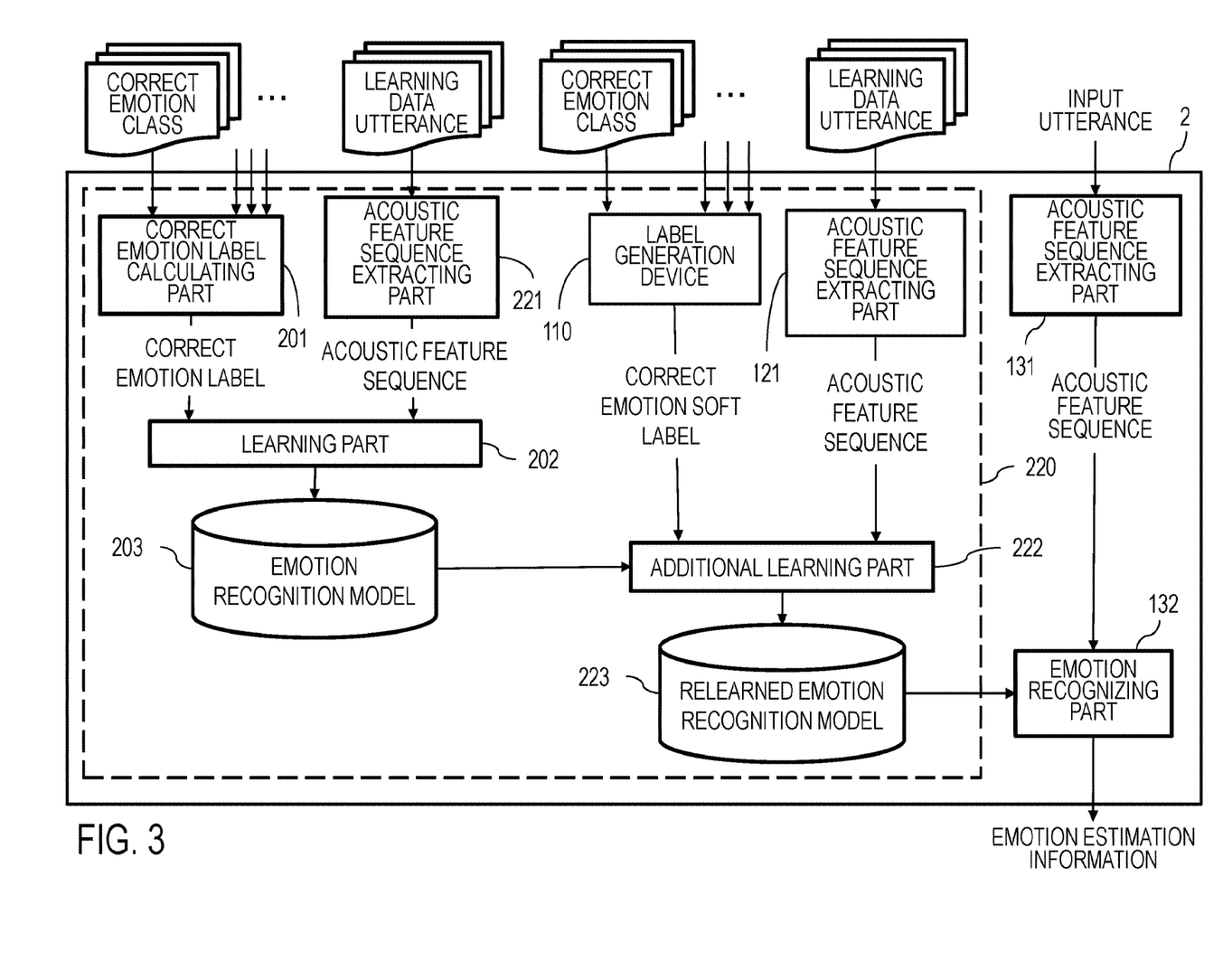
FIG. 3 is a block diagram illustrating a functional configuration of a label generation device of a second embodiment.

As illustrated in FIG. 3, an emotion recognition apparatus 2 of the present embodiment has a model learning device 220, the acoustic feature sequence extracting part 131 and the emotion recognizing part 132. The model learning device 220 has a correct emotion label calculating part 201, a learning part 202, storing parts 203 and 223, acoustic feature sequence extracting parts 221 and 121, the label generation device 110 and an additional learning part 222.

<Correct Emotion Label Calculating Part 201>

With listeners' respective correct emotion classes of a plurality of listeners for a learning data utterance (a second learning data utterance) as an input, the correct emotion label calculating part 201 obtains and outputs correct emotion class labels $t_k^{(h)}$ corresponding to the second learning data utterance (a second utterance). Here, the correct emotion labels $t_k^{(h)}$ corresponding to the second learning data utterance are such that, when each of i' and i" is assumed to be a subscript indicating identification numbers of emotion classes, correct emotion labels $t_{i'}^{(h)}$ corresponding to emotional classes $C_{i'} \in \{C_1, \ldots, C_K\}$ that have been selected as correct values of an emotion of an utterer of the second learning data utterance from among the plurality of emotion classes $C_1, \ldots, C_K$ by listeners who have listened to the second learning data utterance the largest number of times are assumed to be a positive constant (for example, 1), and correct emotion labels $t_{i''}^{(h)}$ corresponding to emotion classes $C_{i''} \in \{C_1, \ldots, C_K\}$ other than the emotion classes $C_{i'}$ among the emotion classes $C_1, \ldots, C_K$ are assumed to be zero. However, if the number of such emotion classes $C_{i'}$ that have been selected as correct values the largest number of times is not one, the correct emotion labels $t_k^{(h)}$ corresponding to the second learning data utterance are not generated. For example, the correct emotion label calculating part 201 calculates the correct emotion labels $t_k^{(h)}$ by the same method as the conventional technique. That is, correct emotion labels $t_{i'}^{(h)}$ corresponding to the emotion classes $C_{i'}$ that have appeared the largest number of times among listeners' respective correct emotion classes of a plurality of listeners for each utterance are set to 1, and other correct emotion labels $t_{i'}^{(h)}$ are set to 0 (Formula (6)). If there are two or more emotion classes that have appeared the largest number of times, the correct emotion labels $t_k^{(h)}$ are not generated for the second learning data utterance.

[Equation 5]

$$t_k^{(h)} = \begin{cases} 1 & \text{if } k = \underset{i'}{\operatorname{argmax}} \dfrac{n_{i'}}{\sum_{i=1}^{K} n_i} \\ 0 & \text{otherwise} \end{cases} \quad (6)$$

Here, $n_i$ indicates the numbers of times that the emotion classes $C_i$ have been selected as correct emotion classes for the second learning data utterance. Here, $n_{i'}$ indicates the numbers of times that the emotion classes have been selected as correct emotion classes for the second learning data utterance. The second learning data utterance (the second utterance) input to the correct emotion label calculating part 201 may be the same as a learning data utterance input to the label generation device 110 described before (a first utterances) or may not be the same (step S201).

<Acoustic Feature Sequence Extracting Part 221>

With a second learning data utterance as an input, the acoustic feature sequence extracting part 221 extracts and outputs a voice feature sequence of the second learning data utterance. The processing by the acoustic feature sequence extracting part 221 is the same as the processing of the acoustic feature sequence extracting part 121 described before (step S221).

<Learning Part 202>

By learning processing with a set of pairs between correct emotion labels $t_k^{(h)}$ corresponding to a second learning data utterance and a voice feature sequence of the second learning data utterance as learning data, the learning part 202 obtains an emotion recognition model for estimating an emotion of an utterer of an input utterance from an acoustic feature sequence of the input utterance (a second emotion recognition model) and outputs the emotion recognition model. At this time, a voice feature sequence of a second learning data utterance for which the correct emotion labels $t_k^{(h)}$ have not been generated are excluded from the learning data. Here, an example of adopting the same emotion recognition model as the conventional technique is shown. For example, when the emotion recognition model is a probability model for obtaining output values $y_k$ about posterior probabilities of the emotion classes $C_k$ for an acoustic feature sequence of an input utterance, for example, the learning part 202 obtains output values $y_k^{(h)}$ about posterior probabilities of the emotion classes $C_k$ by inputting the voice feature sequence of the second learning data utterance to the emotion recognition model in the learning process, and performs learning processing with rates of function values for the output values $y_k^{(h)}$ to a sum total of the function values for output values $y_1^{(h)}, \ldots, y_K^{(h)}$ as posterior probabilities $p_k^{(h)}$ of the emotion classes $C_k$, and with a sum total of products between function values for $p_k^{(h)}$ and correct emotion labels $t_k^{(h)}$ for k=1, ..., K as a loss function. An example of the function values for the output values $y_k^{(h)}$ is non-decreasing function values for $y_k^{(h)}$ (for example, monotonically increasing function values for $y_k^{(h)}$), and an example of the function values for $p_k^{(h)}$ is non-decreasing function values for $p_k^{(h)}$ (for example, monotonically increasing function values for $p_k^{(h)}$). For example, the learning part 202 performs the learning processing using the following soft-max function as the loss function $L_h$.

[Equation 6]

$$L_h = \sum_{k=1}^{K} t_k^{(h)} \log(p_k^{(h)}) \quad (7)$$

$$p_k^{(h)} = \frac{\exp(y_k^{(h)})}{\sum_{i=1}^{K} \exp(y_i^{(h)})} \quad (8)$$

Note that the output values $y_k^{(h)}$ are output values $y_k$ obtained by inputting an acoustic feature sequence corresponding to learning data which is given the correct emotion labels $t_k^{(h)}$, to the emotion recognition model. For example, the learning part 202 calculates a loss function $L_h$ based on Formulas (7) and (8) described before and updates model parameters of the emotion recognition model in the learning process based on the loss function $L_h$ (step S202). Information identifying an emotion recognition model obtained in the end (for example, the model parameters) is stored into the storing part 203 (step S203).

<Additional Learning Part 222>

An emotion recognition model read out from the storing part 203, correct emotion soft labels $t_k^{(s)}$ corresponding to a learning data utterance output from the label generation device 110, and a voice feature sequence of the learning data utterance output from the acoustic feature sequence extracting part 121 are input to the additional learning part 222. By additional learning processing with a set of pairs between correct emotion soft labels $t_k^{(s)}$ corresponding to the learning data utterance (a first utterance) and the voice feature sequence of the learning data utterance as learning data, the additional learning part 222 updates the emotion recognition model (a second emotion recognition model) read out from the storing part 203, obtains a relearned emotion recognition model (a first emotion recognition model) for estimating an emotion of an utterer of an input utterance from an acoustic feature sequence of the input utterance and outputs the relearned emotion recognition model. For example, if the emotion recognition model (the second emotion recognition model) is a model for obtaining output values $y_k$ about posterior probabilities of the emotion classes $C_k$ for an acoustic feature sequence of an input utterance, the additional learning processing includes processing for obtaining output values $y_k^{(s)}$ about posterior probabilities of the emotion classes $C_k$ by inputting the voice feature sequence of the learning data utterance (the first utterance) to an emotion recognition model in a learning process, with the emotion recognition model (the second emotion recognition model) as an initial value of the emotion recognition model in the learning process (an initial model), and updating the emotion recognition model in the learning process, with rates of function values the output values $y_k^{(s)}$ to a sum total of the function values for the output values $y_1^{(s)}, \ldots, y_K^{(s)}$ as posterior probabilities $p_k^{(s)}$ of the emotion classes $C_k$ and with a sum total of products between the function values for $p_k^{(s)}$ and the correct emotion soft labels $t_k^{(s)}$ for k=1, ..., K as a loss function to obtain a relearned emotion recognition model (a first emotion recognition model). For example, the additional learning part 222 calculates a loss function $L_s$ based on Formulas (4) and (5) described before, updates model parameters of the emotion recognition model in the learning process, using an error back propagation method for the loss function $L_s$; and obtains and outputs a relearned emotion recognition model (step S222). Information identifying the obtained relearned emotion recognition model (for example, the model parameters) is stored into the storing part 223 (step S223).

<Emotion Recognizing Part 132>

The emotion recognizing part 132 applies an acoustic feature sequence of an input utterance output from the acoustic feature sequence extracting part 131 to the relearned emotion recognition model identified by the information read from the storing part 223 to obtain and output estimation information about an emotion of an utterer of the input utterance (step S132).

Third Embodiment

A third embodiment will be described. In the present embodiment, model learning is performed by using correct emotion labels $t_k^{(h)}$ and correct emotion soft labels $t_k^{(s)}$ at the same time. By learning two different kinds of labels at the same time, it is possible to optimize a model from two viewpoints of a setting criterion for the correct emotion labels $t_k^{(h)}$ (a majority vote criterion) and a setting criterion for the correct emotion soft labels $t_k^{(s)}$ (a soft label criterion). As a result, it is possible to construct an emotion recognition model that both increases a probability of estimation of an emotion class with the largest probability of being selected and increases a probability of estimation of such an emotion class that appears with a positive probability among the correct emotion soft labels $t_k^{(s)}$ though the probability of being selected is not the largest. As a result, the emotion recognition accuracy is improved. Hereinafter, description will be made mainly on points different from the first and second embodiments, and the description will be simplified by using the same reference numerals for the same matters as the first and second embodiments.

Details of the third embodiment will be described using drawings.

<Configuration and Processing>

Figure 4:
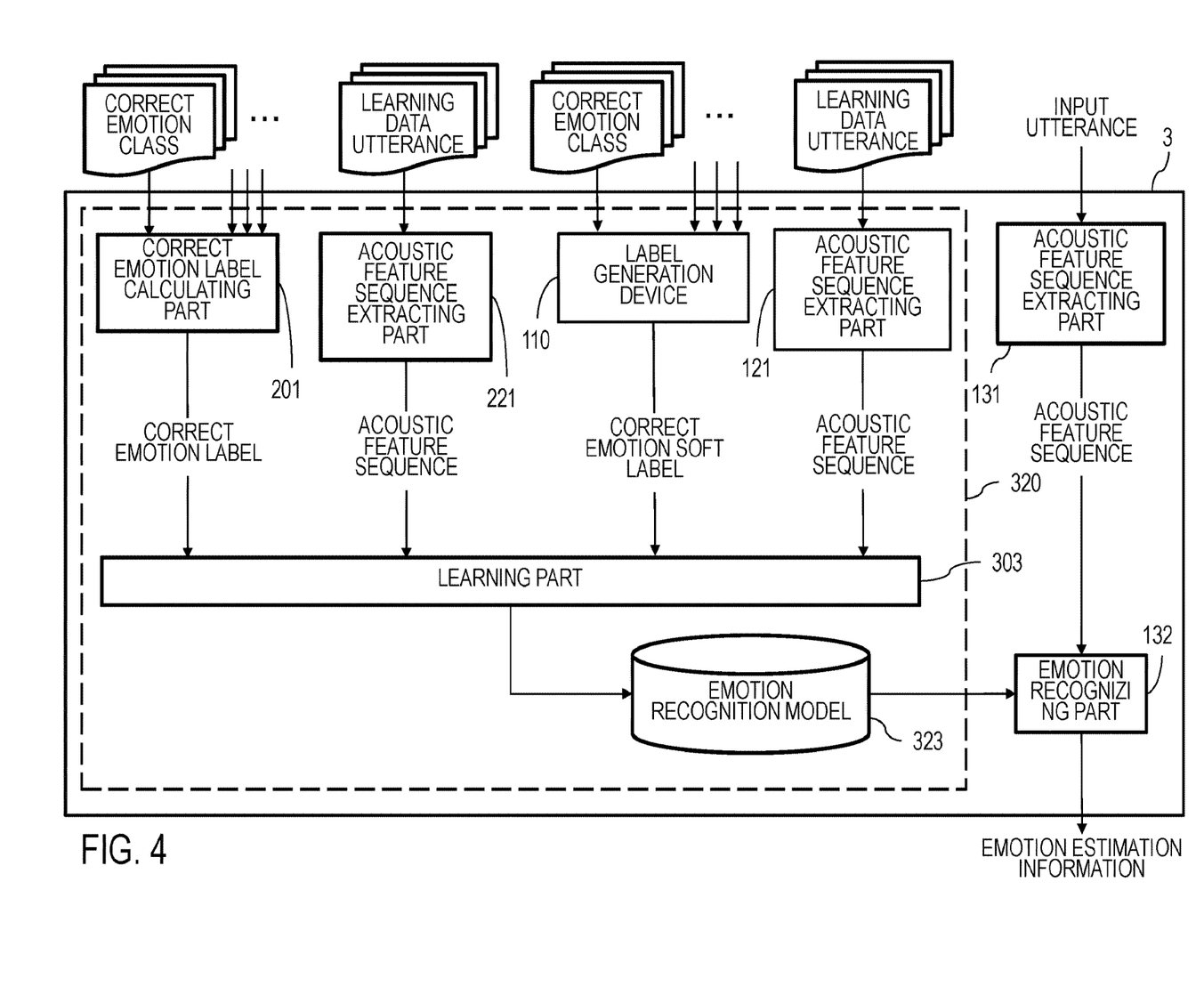
FIG. 4 is a block diagram illustrating a functional configuration of a label generation device of a third embodiment.

As illustrated in FIG. 4, an emotion recognition apparatus 3 of the present embodiment has a model learning device 320, the acoustic feature sequence extracting part 131 and the emotion recognizing part 132. The model learning device 320 has the correct emotion label calculating part 201, the label generation device 110, the acoustic feature sequence extracting parts 221 and 121, a learning part 303 and a storing part 323.

With correct emotion soft labels $t_k^{(s)}$ corresponding to a learning data utterance output from the label generation device 110 (a first utterance), a voice feature sequence of a learning data utterance output from the acoustic feature sequence extracting part 121, correct emotion labels $t_k^{(h)}$ corresponding to a second learning data utterance output from the correct emotion label calculating part 201 (a second utterance), and a voice feature sequence of the second learning data utterance output from the acoustic feature sequence extracting part 221 as an input, the learning part 303 obtains an emotion recognition model for estimating an emotion of an utterer of an input utterance from an acoustic feature sequence of the input utterance by learning processing with a set of combinations of the above as learning data (a first emotion recognition model) and outputs the emotion recognition model. For example, the learning part 303 treats a weighted sum of a loss function $L_h$ by the conventional method and a loss function $L_s$ obtained by the correct emotion soft labels $t_k^{(s)}$ as a new loss function L to learn the emotion recognition model. For example, when the emotion recognition model is a model for obtaining output values $y_k$ about posterior probabilities of the emotion classes $C_k$ for an acoustic feature sequence of an input utterance, the learning processing includes processing for obtaining output values $y_k^{(h)}$ about posterior probabilities of the emotion classes $C_k$ by inputting the voice feature sequence of the second learning data utterance (the second utterance) to an emotion recognition model in a learning process, obtaining output values $y_k^{(s)}$ about posterior probabilities of the emotion classes $C_k$ by inputting a voice feature sequence of the learning data utterance (the first utterance) to the emotion recognition model in the learning process, and learning the emotion recognition model, with a rates of function values for the output values $y_k^{(h)}$ to a sum total of the function values for the output values $y_1^{(h)}, \ldots, y_K^{(h)}$ as posterior probabilities $p_k^{(h)}$ of the emotion classes $C_k$ in the second learning data utterance, with rates of function values for the output values $y_k^{(s)}$ to a sum total of the function values for the output values $y_1^{(s)}, \ldots, y_K^{(s)}$ as posterior probabilities $p_k^{(s)}$ of the emotion classes $C_k$ in the learning data utterance, and with a weighted sum of a sum total of products between function values for $p_k^{(h)}$ and the correct emotion labels $t_k^{(h)}$ for k=1, ..., K as the loss function L. The learning part 303 calculates the loss function L, for example, according to Formula (9) below.

[Equation 7]

$$L = \gamma L_h + (1 - \gamma)L_s \qquad (9)$$

$$= \gamma \sum_{k=1}^{K} t_k^{(h)} \log(p_k^{(h)}) + (1 - \gamma) \sum_{k=1}^{K} t_k^{(s)} \log(p_k^{(s)})$$

Here, γ is a weight parameter that takes a value from 0 to 1, and the emotion recognition model is learned so that influence of the correct emotion labels $t_k^{(h)}$ is stronger as γ is larger, and influence of the correct emotion soft labels $t_k^{(s)}$ is stronger as γ is smaller. The learning part 303 uses, for example, the loss function L, which is the weighted sum, to update model parameters of the emotion recognition model in the learning process using an error back propagation method and performs model learning (step S303). Information identifying an emotion recognition model obtained in the end (for example, the model parameters) is stored into the storing part 323 (step S323).

<Emotion Recognizing Part 132>

The emotion recognizing part 132 applies an acoustic feature sequence of an input utterance output from the acoustic feature sequence extracting part 131 to the emotion recognition model identified by the information read from the storing part 323 to obtain and output information about estimation of an emotion of an utterer of the input utterance (step S132).

[Other Modifications and the Like]

The present invention is not limited to the embodiments described above. For example, a model other than a time-series model based on deep learning may be used as an emotion recognition model. For example, a support vector machine (SVM), a hidden Markov model (HMM) or the like may be used as an emotion recognition model. The various kinds of processing described above are not only executed in a time series in order of the description. The various kinds of processing may be executed in parallel or individually according to processing capacity of an apparatus to execute the processing or as necessary. As smoothed values of the rates of the numbers of times $n_k$ to the sum total of the numbers of times $n_1, \ldots, n_K$, the case of $\alpha>0$ in Formula (1) has been shown as an example. However, the rates may be smoothed by a different method. For example, $\alpha$ in Formula (1) may be substituted with $\alpha_i$ that is dependent on a correct emotion class, and $\alpha K$ may be substituted with $\alpha + \ldots + \alpha_K$. In addition, it goes without saying that changes may be appropriately made within a range not departing from the spirit of the present invention.

Each of the above apparatuses is configured, for example, by a general-purpose or dedicated computer provided with a processor (a hardware processor) such as a CPU (central processing unit) and memories such as a RAM (random-access memory) and a ROM (read-only memory), and the like executing a predetermined program. This computer may be provided with one processor and one memory or may be provided with a plurality of processors and memories. This program may be installed in the computer or may be recorded in the ROM or the like in advance. A part or all of the processing parts may be configured using not an electronic circuit (circuitry) that realizes functional configurations by a program being read, like a CPU but an electronic circuit that realizes processing functions without using a program. An electronic circuit composing one apparatus may include a plurality of CPUs.

In a case of realizing the above configuration by a computer, processing content of functions which each apparatus should have is written by a program. By executing this program on the computer, the above processing functions are realized on the computer. The program in which the processing content is written can be recorded in a computer-readable recording medium. An example of the computer-readable recording medium is a non-transitory recording medium. Examples of such a recording medium are magnetic recording device, an optical disk, a magneto-optical recording medium, a semiconductor memory and the like.

Distribution of the program is performed, for example, by performing sales, transfer, lending or the like of a portable recording medium, such as a DVD or a CD-ROM, in which the program is recorded. Furthermore, a configuration is also possible in which the program is stored in a storage device of a server computer, and the program is distributed by transferring the program from the server computer to other computers via a network.

For example, the computer which executes such a program stores the program recorded in a portable recording medium or transferred from a server computer into its storage device once. At the time of executing processing, the computer reads the program stored in its own storage device and executes processing according to the read program. As another form of execution of the program, it is also possible for the computer to read the program directly from the portable recording medium and execute the processing according to the program. Furthermore, it is also possible for the computer to, each time a program is transferred from the server computer to the computer, execute processing according to the received program in order. A configuration is also possible in which the above processing is executed by a so-called ASP (Application Service Provider) type service in which, without transferring the program from the server computer to the computer, the processing functions are realized only by an instruction to execute the program and acquisition of a result.

Not all the processing functions of the present apparatus is realized by causing a predetermined program to be executed on a computer, but at least a part of the processing functions may be realized by hardware.

DESCRIPTION OF REFERENCE NUMERALS

1 to 3: emotion recognition apparatus
110: label generation device
120, 220, 320: model learning device

What is claimed is:

1. A label generation device, wherein
K is an integer equal to or larger than 2; and
the label generation device comprises processing circuitry configured to:
reproduce an audible recording as a first utterance of an utterer before a predetermined number of listeners;
obtain an input of an emotion class corresponding to an estimate of an emotion of the utterer, as a correct emotion class, among a plurality of emotion classes $C_1, \ldots, C_K$ from the listeners who have listened to the first utterance;
determine a number of times $n_i$ that the emotion classes $C_i$ have been selected as the correct emotion classes, where $i=1, \ldots, K$ is assumed;
obtain rates of the numbers of times $n_k$ to a sum total of the numbers of times $n_1, \ldots, n_K$ or smoothed values of the rates, for each of the plurality of emotion classes, as correct emotion soft labels $t_k^{(s)}$ corresponding to the first utterance, and
output the correct emotion soft labels $t_k^{(s)}$ as labels of learning data for model learning,
wherein
the following formula is satisfied:

$$t_k^{(s)} = \frac{\alpha + n_k}{\alpha K + \sum_{i=1}^{K} n_i}$$

$\alpha = \alpha_1$ is satisfied when the number of the listeners is $M_1$;
$\alpha = \alpha_2$ is satisfied when the number of the listeners is $M_2$; and $M_1 > M_2$ and $0 < \alpha_1 < \alpha_2$ are satisfied such that $\alpha$ is increased when the number of listeners is $M_2$, and $\alpha$ is decreased when the number of listeners is $M_1$.

2. A model learning device comprising:
the label generation device according to claim 1; and
processing circuitry configured to obtain a first emotion recognition model for estimating an emotion of an utterer of an input utterance from an acoustic feature sequence of the input utterance by learning processing with a set of pairs between the correct emotion soft labels $t_k^{(s)}$ corresponding to the first utterance and a voice feature sequence of the first utterance as learning data.

3. A model learning device, wherein
K is an integer equal to or larger than 2; and
the model learning device comprises:
processing circuitry configured to:
obtain an input of an emotion class corresponding to an estimate of an emotion of an utterer, as a correct emotion class, among a plurality of emotion classes $C_1, \ldots, C_K$ from the listeners who have listened to a first utterance of the utterer;

determine a number of times $n_i$ that the emotion classes $C_i$ have been selected as the correct emotion classes, where i=1, ..., K is assumed;

obtain rates of the numbers of times $n_k$ to a sum total of the numbers of times $n_1$, ..., $n_K$ or smoothed values of the rates, for each of the plurality of emotion classes, as correct emotion soft labels $t_k^{(s)}$ corresponding to the first utterance;

obtain a second emotion recognition model for estimating an emotion of an utterer of an input utterance from an acoustic feature sequence of the input utterance by learning processing with a set of pairs between correct emotion labels $t_k^{(h)}$ corresponding to a second utterance and a voice feature sequence of the second utterance as learning data; and update the second emotion recognition model by additional learning processing with a set of pairs between the correct emotion soft labels $t_k^{(s)}$ corresponding to the first utterance and a voice feature sequence of the first utterance as learning data to obtain a first emotion recognition model for estimating the emotion of the utterer of the input utterance from the acoustic feature sequence of the input utterance; wherein the correct emotion labels $t_k^{(h)}$ corresponding to the second utterance are such that correct emotion labels $t_{i'}^{(h)}$ corresponding to emotion classes $C_{i'}$ selected as correct values of an emotion of an utterer of the second utterance from among the plurality of emotion classes $C_1$, ..., $C_K$ by listeners who have listened to the second utterance the largest number of times are assumed to be positive constants, and correct emotion labels $t_{i''}^{(h)}$ corresponding to emotion classes $C_{i''}$ other than the emotion classes $C_{i'}$ among the emotion classes $C_1$, ..., $C_K$ are assumed to be zero.

4. The model learning device of claim 3, wherein
the second emotion recognition model is assumed to be an emotion recognition model in a learning process;
by inputting the voice feature sequence of the first utterance to the emotion recognition model in the learning process, output values $y_k^{(s)}$ about posterior probabilities of the emotion classes $C_k$ are obtained; and
the additional learning processing includes processing for updating the emotion recognition model in the learning process, with rates of function values for the output values $y_k^{(s)}$ to a sum total of the function values for the output values $y_1^{(s)}$, ..., $y_K^{(s)}$ as posterior probabilities $p_k^{(s)}$ of the emotion classes $C_k$, and with a sum total of products between function values for $p_k^{(s)}$ and the correct emotion soft labels $t_k^{(s)}$ for k=1, ..., K as a loss function, to obtain the first emotion recognition model.

5. A model learning device, wherein
K is an integer equal to or larger than 2; and
the model learning device comprises:
processing circuitry configured to:
obtain an input of an emotion class corresponding to an estimate of an emotion of an utterer, as a correct emotion class, among a plurality of emotion classes $C_1$, ..., $C_K$ from the listeners who have listened to a first utterance of the utterer;
determine a number of times $n_i$ that the emotion classes $C_i$ have been selected as the correct emotion classes, where i=1, ..., K is assumed;
obtain rates of the numbers of times $n_k$ to a sum total of the numbers of times $n_1$, ..., $n_K$ or smoothed values of the rates, for each of the plurality of emotion classes, as correct emotion soft labels $t_k^{(s)}$ corresponding to the first utterance;

obtain a first emotion recognition model for estimating an emotion of an utterer of an input utterance from an acoustic feature sequence of the input utterance by learning processing with a set of combinations among the correct emotion soft labels $t_k^{(s)}$ corresponding to the first utterance, a voice feature sequence of the first utterance, correct emotion labels $t_k^{(h)}$ corresponding to a second utterance and a voice feature sequence of the second utterance as leaning data; wherein the correct emotion labels $t_k^{(h)}$ corresponding to the second utterance are such that correct emotion labels $t_{i'}^{(h)}$ corresponding to emotion classes $C_{i'}$ selected as correct values of an emotion of an utterer of the second utterance from among the plurality of emotion classes $C_1$, ..., $C_K$ by listeners who have listened to the second utterance the largest number of times are assumed to be positive constants, and correct emotion labels $t_{i''}^{(h)}$ corresponding to emotion classes $C_{i''}$ other than the emotion classes $C_{i'}$ among the emotion classes $C_1$, ..., $C_K$ are assumed to be zero;

by inputting the voice feature sequence of the second utterance to an emotion recognition model in a learning process, output values $y_k^{(s)}$ about posterior probabilities of the emotion classes $C_k$ are obtained;

by inputting the voice feature sequence of the first utterance to the emotion recognition model in the learning process, output values $y_k^{(s)}$ about posterior probabilities of the emotion classes $C_k$ are obtained; and the learning processing includes processing for updating the emotion recognition model in the learning process, with rates of function values for output values $y_k^{(h)}$ to a sum total of the function values for the output values $y_1^{(h)}$, ..., $y_K^{(h)}$ as posterior probabilities $p_k^{(h)}$ of the emotion classes $C_k$ in the second utterance, with rates of function values for the output values $y_k^{(s)}$ to a sum total of the function values for the output values $y_1^{(s)}$, ..., $y_K^{(s)}$ as posterior probabilities $p_k^{(s)}$ of the emotion classes $C_k$ in the first utterance, and with a weighted sum of a sum total of products between the function values for $p_k^{(h)}$ and the correct emotion labels $t_k^{(h)}$ for k=1, ..., K and a sum total of products between function values for $p_k^{(s)}$ and the correct emotion soft labels $t_k^{(s)}$ for k=1, ..., K as a loss function, to obtain the first emotion recognition model.

6. An emotion recognition apparatus comprising:
the model learning device of any of claims 2 to 5, and
processing circuitry configured to apply an acoustic feature sequence of the input utterance to the first emotion recognition model for obtaining output values $y_k$ about posterior probabilities of the emotion classes $C_k$ for the acoustic feature sequence of the input utterance to output the output values $y_k$, function values for the output values $y_k$ or information indicating such emotion classes $C_k$ that the posterior probabilities indicated by the output values $y_k$ are the largest.

7. A label generation method implemented by processing circuitry of a label generation device, wherein
K is an integer equal to or larger than 2; and
the label generation method comprises:
reproducing an audible recording as a first utterance before a predetermined number of listeners;
obtaining an input of an emotion class corresponding to an estimate of an emotion of the utterer, as a correct emotion class, among a plurality of emotion classes $C_1$, ..., $C_K$ from the listeners who have listened to the first utterance;

determining a number of times $n_i$ that the emotion classes $C_i$ have been selected as the correct emotion classes, where i=1, . . . , K is assumed;

obtaining rates of the numbers of times $n_k$ to a sum total of the numbers of times $n_1, \ldots, n_K$ or smoothed values of the rates, for each of the plurality of emotion classes, as correct emotion soft labels $t_k^{(s)}$ corresponding to the first utterance, and outputting the correct emotion soft labels $t_k^{(s)}$ as labels of learning data for model learning, wherein the following formula is satisfied:

$$t_k^{(s)} = \frac{\alpha + n_k}{\alpha K + \sum_{i=1}^{K} n_i}$$

$\alpha = \alpha_1$ is satisfied when the number of the listeners is $M_1$; $\alpha = \alpha_2$ is satisfied when the number of the listeners is $M_2$; and $M_1 > M_2$ and $0 < \alpha_1 < \alpha_2$ are satisfied such that $\alpha$ is increased when the number of listeners is $M_2$, and $\alpha$ is decreased when the number of listeners is $M_1$.

8. A model learning method comprising:

the label generation method of claim 7; and a learning step of processing circuitry of a model learning device obtaining a first emotion recognition model for estimating an emotion of an utterer of an input utterance from an acoustic feature sequence of the input utterance by learning processing with a set of pairs between the correct emotion soft labels $t_k^{(s)}$ corresponding to the first utterance and a voice feature sequence of the first utterance as learning data.

9. A model learning method implemented by processing circuitry of a model learning device, wherein K is an integer equal to or larger than 2; and the model learning method comprises:

obtaining an input of an emotion class, as a correct emotion class, among a plurality of emotion classes $C_1, \ldots, C_K$ from the listeners who have listened to a first utterance;

determining a number of times $n_i$ that the emotion classes $C_i$ have been selected as the correct emotion classes, where i=1, . . . , K is assumed;

obtaining rates of the numbers of times $n_k$ to a sum total of the numbers of times $n_1, \ldots, n_K$ or smoothed values of the rates, for each of the plurality of emotion classes, as correct emotion soft labels $t_k^{(s)}$ corresponding to the first utterance;

obtaining a second emotion recognition model for estimating an emotion of an utterer of an input utterance from an acoustic feature sequence of the input utterance by learning processing with a set of pairs between correct emotion labels $t_k^{(h)}$ corresponding to a second utterance and a voice feature sequence of the second utterance as learning data; and updating the second emotion recognition model by additional learning processing with a set of pairs between the correct emotion soft labels $t_k^{(s)}$ corresponding to the first utterance and a voice feature sequence of the first utterance as learning data to obtain a first emotion recognition model for estimating the emotion of the utterer of the input utterance from the acoustic feature sequence of the input utterance; wherein the correct emotion labels $t_k^{(h)}$ corresponding to the second utterance are such that correct emotion labels $t_{i'}^{(h)}$ corresponding to emotion classes $C_{i'}$ selected as correct values of an emotion of an utterer of the second utterance from among the plurality of emotion classes $C_1, \ldots, C_K$ by listeners who have listened to the second utterance the largest number of times are assumed to be positive constants, and correct emotion labels $t_{i''}^{(h)}$ corresponding to emotion classes $C_{i''}$ other than the emotion classes $C_{i'}$ among the emotion classes $C_1, \ldots, C_K$ are assumed to be zero.

10. The model learning method according to claim 9, wherein the second emotion recognition model is assumed to be an emotion recognition model in a learning process;

by inputting the voice feature sequence of the first utterance to the emotion recognition model in the learning process, output values $y_k^{(s)}$ about posterior probabilities of the emotion classes $C_k$ are obtained; and the additional learning processing includes processing for updating the emotion recognition model in the learning process, with rates of function values for the output values $y_k^{(s)}$ to a sum total of the function values for the output values $y_1^{(s)}, \ldots, y_K^{(s)}$ as posterior probabilities $p_k^{(s)}$ of the emotion classes $C_k$, and with a sum total of products between function values for $p_k^{(s)}$ and the correct emotion soft labels $t_k^{(s)}$ for k=1, . . . , K as a loss function, to obtain the first emotion recognition model.

11. A model learning method, implemented by processing circuitry of a model learning device, wherein K is an integer equal to or larger than 2; and the model learning method comprises:

obtaining an input of an emotion class, as a correct emotion class, among a plurality of emotion classes $C_1, \ldots, C_K$ from the listeners who have listened to a first utterance;

determining a number of times $n_i$ that the emotion classes $C_i$ have been selected as the correct emotion classes, where i=1, . . . , K is assumed;

obtaining rates of the numbers of times $n_k$ to a sum total of the numbers of times $n_1, \ldots, n_K$ or smoothed values of the rates, for each of the plurality of emotion classes, as correct emotion soft labels $t_k^{(s)}$ corresponding to the first utterance, obtaining a first emotion recognition model for estimating an emotion of an utterer of an input utterance from an acoustic feature sequence of the input utterance by learning processing with a set of combinations among the correct emotion soft labels $t_k^{(s)}$ corresponding to the first utterance, a voice feature sequence of the first utterance, correct emotion labels $t_k^{(h)}$ corresponding to a second utterance and a voice feature sequence of the second utterance as leaning data; wherein the correct emotion labels $t_k^{(h)}$ corresponding to the second utterance are such that correct emotion labels $t_{i'}^{(h)}$ corresponding to emotion classes $C_{i'}$ selected as correct values of an emotion of an utterer of the second utterance from among the plurality of emotion classes $C_1, \ldots, C_K$ by listeners who have listened to the second utterance the largest number of times are assumed to be positive constants, and correct emotion labels $t_{i''}^{(h)}$ corresponding to emotion classes $C_{i''}$ other than the emotion classes $C_{i'}$ among the emotion classes $C_1, \ldots, C_K$ are assumed to be zero;

by inputting the voice feature sequence of the second utterance to an emotion recognition model in a learning process, output values $y_k^{(s)}$ about posterior probabilities of the emotion classes $C_k$ are obtained;

by inputting the voice feature sequence of the first utterance to the emotion recognition model in the learning process, output values $y_k^{(s)}$ about posterior probabilities of the emotion classes $C_k$ are obtained; and the learning processing includes processing for updating the emotion recognition model in the learning process, with rates of function values for output values $y_k^{(h)}$ to a sum total of the function values for the output values $y_1^{(h)}, \ldots, y_K^{(h)}$ as posterior probabilities $p_k^{(h)}$ of the emotion classes $C_k$ in the second utterance, with rates of function values for the output values $y_k^{(s)}$ to a sum total of the function values for the output values $y_1^{(h)}, \ldots, y_K^{(s)}$ as posterior probabilities $p_k^{(s)}$ of the emotion classes $C_k$ in the first utterance, and with a weighted sum of a sum total of products between the function values for $p_k^{(h)}$ and the correct emotion labels $t_k^{(h)}$ for $k=1, \ldots, K$ and a sum total of products between function values for $p_k^{(s)}$ and the correct emotion soft labels $t_k^{(s)}$ for $k=1, \ldots, K$ as a loss function, to obtain the first emotion recognition model.

12. An emotion recognition method comprising:
each step of the model learning method of any of claims 8 to 11; and
an emotion recognition step of processing circuitry of an emotion recognition apparatus applying an acoustic feature sequence of the input utterance to the first emotion recognition model for obtaining output values $y_k$ about posterior probabilities of the emotion classes $C_k$ for the acoustic feature sequence of the input utterance to output the output values $y_k$, function values for the output values $y_k$ or information indicating such emotion classes $C_k$ that the posterior probabilities indicated by the output values $y_k$ are the largest.

13. A non-transitory machine-readable recording medium storing a program for causing a computer to function as any of the label generation device of claim 1, or the model learning device of any of claims 2 to 5.

14. A non-transitory machine-readable recording medium storing a program for causing a computer to function as the emotion recognition apparatus of claim 6.

* * * * *